July 1, 1958 J. W. RIEKE 2,841,638
METHOD FOR FREQUENCY MODULATED COLOR
TELEVISION TRANSMISSION
Filed Sept. 17, 1953 2 Sheets-Sheet 1

INVENTOR
J. W. RIEKE
BY W. Adams Jr.
ATTORNEY

INVENTOR
J. W. RIEKE
BY
ATTORNEY 2,841,638
Patented July 1, 1958

2,841,638

METHOD FOR FREQUENCY MODULATED COLOR TELEVISION TRANSMISSION

John W. Rieke, Basking Ridge, N. J., assignor to Bell Telephone Laboratories, Incorporated, New York, N. Y., a corporation of New York Application September 17, 1953, Serial No. 380,730

2 Claims. (Cl. 178—5.2)

This invention relates to radio transmission systems and more particularly to the modification of frequency modulation radio systems to permit transmission of the National Television Standards Committee (NTSC) color television signals.

The NTSC color television signal as specified, for example, in an article entitled "Principles of NTSC compatible color television" by C. Hirsh, W. Bailey and B. Loughlin, published in Electronics for February 1952, beginning at page 88, includes information as to the luminance, the hue and the color saturation of the picture element represented by the signal. For this purpose a signal similar in many respects to the conventional black and white television signal is employed to transmit the luminance information as well as the usual horizontal and vertical synchronizing information.

The remaining picture information, namely information as to the chrominance (i. e. the hue and saturation) of the color of a particular picture element is transmitted by modulations of a high frequency sub-carrier effectively superimposed upon the luminance signal as an axis. The phase of this color carrier is modulated to transmit information as to the hue while the amplitude is modulated in accordance with the saturation of that hue. In addition a short burst of the high frequency sub-carrier is transmitted on the "back porch" of each synchronizing signal to serve at the receiver as a standard for the evaluation of the phase modulations.

It has been found that when such color television signals are transmitted over frequency modulation radio facilities, the color television signal is distorted in such a way that improper rendition of color results when the signal is demodulated by a color television receiver.

It is the object of the present invention to reduce or eliminate such errors of rendition to permit faithful reproduction of color scenes by NTSC color television signals after transmission over frequency modulation systems, particularly multirepeatered systems.

Analysis indicates that such inaccuracies as improper rendition of hue and saturation result from the fact that frequency modulation transmission is employed in the radio systems of the kind contemplated and from the additional fact that such radio systems suffer an overall envelope delay distortion. As a result of such delay distortion different components of the frequency modulated wave are received with different amounts of delay or phase shift. In a frequency modulation system, wherein the frequency of the carrier is modulated in proportion to the amplitude of the modulating signal, envelope delay distortion thus results in such a modification of the transmitted wave that base band signals of different amplitudes are subjected to different phase shifts.

In particular the fact that the color carrier, modulated in phase and amplitude in accordance with the information as to hue and saturation respectively, is combined with the luminance information for transmission results in superimposing the color carrier on the luminance signal as an axis. Accordingly in the frequency modulated signal, the same color information may be represented by quite different frequency components depending upon the instantaneous luminance. Due to the fact that the phase shifts or delays to which such various frequency components may be subjected by reason of enevlope delay distortion may be markedly different, the received information as to hue, which is a phase modulation of the color carrier, may be quite different from that applied at the transmitter. Such discrepancies are due solely to variations in the instantaneous luminance information which is transmitted at the same time.

Similarly, the synchronizing burst of color carrier is always applied to the transmitter at the same amplitude level and is consequently represented by the same frequency components of the frequency modulated signal. On the other hand, the amplitude level of the effective axis of the color carrier may vary widely with luminance as pointed out above and the chroma signal is consequently represented in the frequency modulated wave by correspondingly different frequency components for which the phase shifts are markedly different. As a result, when the phase of the received color carrier is compared with the output of a local oscillator in the receiver which is controlled by the synchronizing color burst, the recovered hue information may be quite different from that applied at the transmitter, depending entirely upon the particular instantaneous luminance transmitted and the delay distortion of the transmission system involved.

In accordance with the invention, therefore, the color television signal is modified prior to its application to the frequency modulator of the radio system to reduce the deleterious effects of the distortions introduced in transmission through the system. To this end the color television signal is applied to the frequency modulation transmitter through a pre-emphasis or weighting network which attenuates the lower frequency components of the signal with respect to the remaining components and thus effectively compresses the amplitude range in which the majority of the luminance information is transmitted. This results in a reduction of the swing in frequency of the frequency modulator produced by the luminance signals and correspondingly locates the axes of the high frequency chroma signals within a narrower frequency range. The delay distortion over this range is less than would be experienced by signals applied to the transmitter without compression and thus the phase and amplitude variations in the high frequency chroma signals are minimized. A de-emphasis or restorer network having a characteristic complementary to that of the pre-emphasis network acts upon the output of the transmission system to restore the color television signal to the original amplitude range.

The above and other features of the invention will be discussed in detail in the following specification taken in connection with the drawings, in which.

Figure 1:
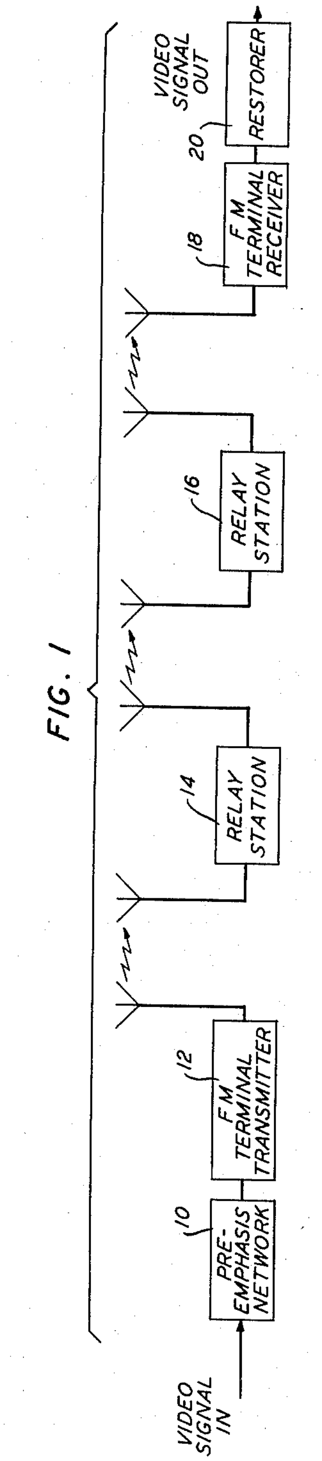
Fig. 1 is a block diagram of a radio relay system as modified according to the invention.

Fig. 1 illustrates in block form a typical frequency modulation radio relay system as modified in accordance with the invention. Such a radio relay system is disclosed in an article entitled "The TD–2 microwave radio relay system" by A. A. Roetken, K. D. Smith and R. W. Friis, beginning at page 1041 of the Bell System Technical Journal for October 1951, part II. In this system the video signal is applied to a frequency modulation terminal transmitter 12 in which it is frequency modulated upon an intermediate frequency carrier. The modulated wave is then beat up to microwave frequencies for transmission usually by way of relay stations such as 14 and 16 to a frequency modulation terminal receiver 18 arranged to produce an output signal the amplitude of which is proportional to the frequency of the received carrier wave. When relay stations are employed as shown in the drawing, the microwave signal is reduced to the intermediate frequency for amplification and the amplified intermediate frequency wave beat back up to microwave frequency for retransmission. When such a system is modified according to the invention, the color television or video signal is applied through a pre-emphasis network 10 to the frequency modulation terminal transmitter 12 and the output signal from the terminal receiver 18 is applied to a restorer 20 prior to its application to local distribution or program circuits.

Predistortion and restoring networks suitable for use in the modified system are well known and many different arrangements having suitable transmission characteristics as specified hereinafter have been proposed in the past. Typical networks of this kind are disclosed in Patent 1,871,986 to H. S. Hamilton, August 16, 1932. It will be understood that the specific design of the networks to be employed will depend upon the characteristics of the transmission systems in which they are to be inserted according to the invention.

The internal details of the radio relay system extending from frequency modulation transmitter 12 through frequency modulation receiver 18 are not important with relation to the present invention except that frequency modulation is used as the method of transmission. In addition, it is assumed that the transmitted wave is subject to envelope delay distortion in the course of transmission over the system. As has been pointed out above, the effect of such envelope delay distortion is to vary the relative or differential phase and amplitude of various components of the video signal. Such variations as cause the improper rendition of color television images are reduced or eliminated in accordance with the invention by use of preliminary pre-emphasis of the signal prior to application thereof to the transmitter and complementary restoration of the signal following the receiver.

Figures 2, 3:
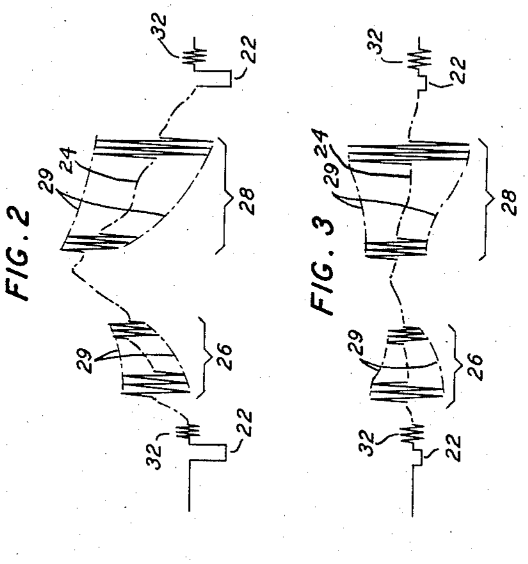
Figs. 2 and 3 are wave form diagrams showing the effect of pre-emphasis according to the invention upon the NTSC color television signal.

A typical color television signal according to the NTSC standard is illustrated in essential in the wave form of Fig. 2. This signal includes synchronizing pulses 22 and luminance information indicated by the dot-dash curve 24 similar to the corresponding components of a monochrome signal. In addition chrominance (hue and saturation) information is transmitted as modulations upon a high-frequency sub-carrier superimposed upon the luminance signal 24 as an axis. This sub-carrier is transmitted continuously except during synchronizing intervals but may reach zero amplitude when no color is present in the scene being televised. For purposes of illustration only portions of the modulated sub-carrier are shown, at 26 and 28 for example. Dashed lines 29 represent the envelope of the modulated color carrier.

In addition to the above, the signal also includes bursts 32 of the sub-carrier frequency which are commonly known as color burst synchronizing signals and are employed at the color television receiver to permit recovery of color information from the signal wave.

It will be recognized from examination of the wave form of Fig. 2 that depending upon the luminance of the picture element represented by the complex signal wave, the axis of the modulated high frequency sub-carrier representing a particular hue and saturation may be located at any of a wide range of amplitudes in the video signal and at any corresponding frequencies after frequency modulation for radio transmission. The effect of this phenomenon when such a signal is transmitted over a facility having envelope delay distortion can be understood by reference to the graph of Fig. 5.

In this graph the curve 30 is a plot of relative delay as a function of frequency and represents the envelope delay distortion for a typical radio relay system having an intermediate frequency pass band extending from 66 to 74 megacycles per second. The television signal of Fig. 2 is reproduced as the solid line curve 34 (the envelope of the color frequency component being omitted for clarity) the amplitude limits of which have been chosen to coincide with frequencies at which such amplitudes might be transmitted in a typical frequency modulation system. Thus the lower amplitude limit of the synchronizing pulses 22 is fixed at the lower frequency limit of the pass band and the maximum signal amplitude extends to the other limit of the band. It will be noted that as the amplitude of the video signal varies the frequency of the intermediate frequency carrier varies over the entire range between 66 and 74 megacycles. As illustrated by curve 30 the delay varies materially over this range and the delay excursion corresponding to the full frequency swing is indicated by the spacing of lines *a* and *b*. Often the variations in relative phase and amplitude corresponding to such a delay excursion are sufficient to cause major changes in the rendition of color at the receiver.

Figure 4:
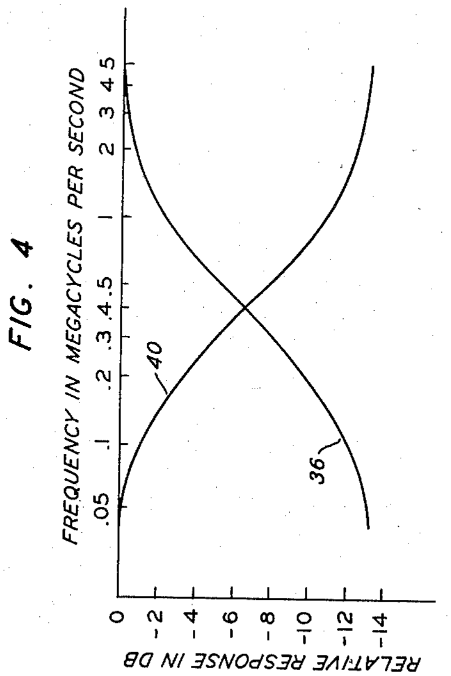
Fig. 4 is a graph showing the transmission characteristics of the pre-emphasis and restorer networks of Fig. 1.

The pre-emphasis network 10 which is inserted at the input of the terminal transmitter 12 acts upon the video frequency signal of Fig. 2 in such a way as to materially reduce the amplitude range occupied by the majortiy of the components of the video signal which represent the luminance information. Since most of the significant luminance information is represented by the lower frequencies, pre-emphasis network 10 may have a transmission characteristic of the type illustrated by curve 36 of Fig. 4. It will be noted that the effect of this characteristic is substantially to compress or attenuate the lower frequency components of the applied signal with respect to the higher for all frequencies up to a frequency of approximately one megacycle per second. (Note that frequency is plotted on a logarithmic coordinate.) Frequency components above this limit are transmitted without substantial amplitude modification.

The effect of such pre-emphasis upon the color television signal illustrated in Fig. 2 may be seen by reference to the wave form of Fig. 3. It will be noted that the synchronizing pulses 22 and the luminance wave 24 are reduced in amplitude by a factor of approximately 5 while the higher frequency chroma signals 26 and 28 and the color burst synchronizing signals 32 undergo substantially no change in amplitude. It will be further recognized that by virtue of such pre-emphasis, the axes of these high frequency signals fall within a greatly restricted amplitude range as compared with the range occupied by the axes in the unmodified color television signal of Fig. 2.

Figure 5:
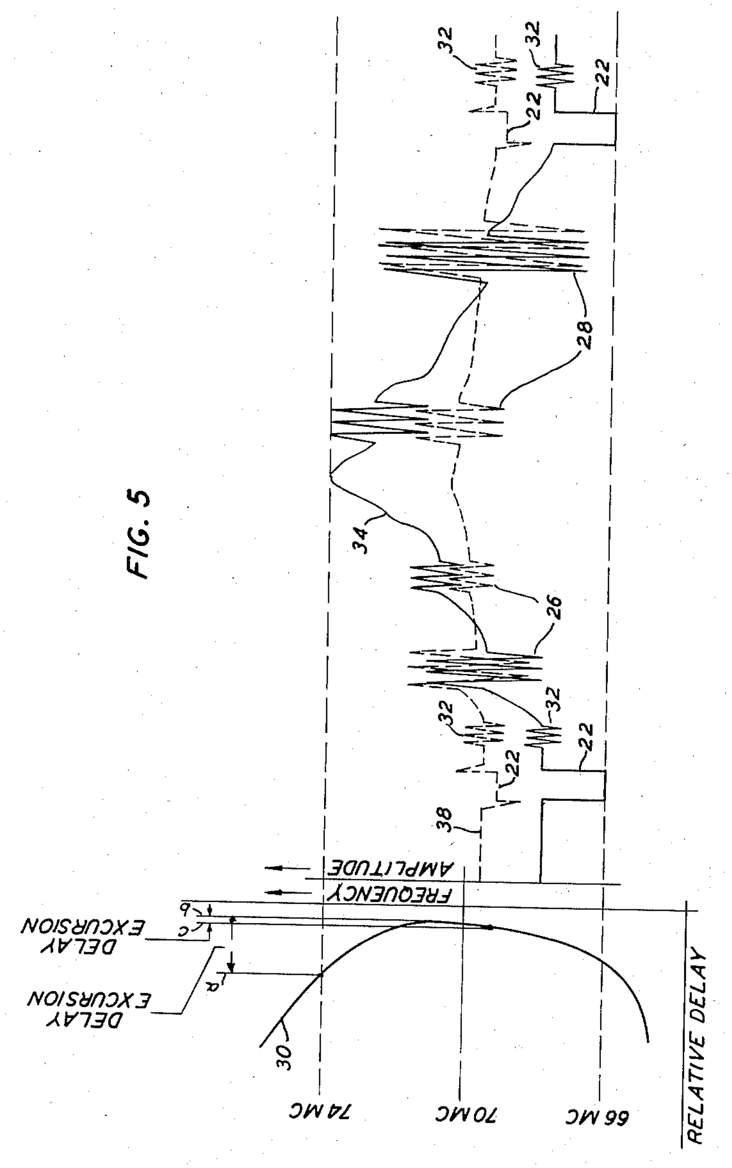
Fig. 5 is a graph illustrating the reduction of transmission errors resulting from the introduction of the pre-emphasis and restorer networks of applicant's invention.

The modified television signal of Fig. 3 is also traced as dash-lined curve 38 of Fig. 5 and it will be easily recognized that between the frequencies of the modulated wave corresponding to the restricted amplitude range in which the axes of the chrominance signals of the modified wave fall, the delay excursion as defined by lines *b* and *c* is substantially reduced. As a result of this action the chroma signals are transmitted over the frequency modulation radio facility with greatly reduced variations in relative phase and amplitude and the color information is faithfully preserved throughout the system.

As pointed out above the output of the frequency modulation receiver is applied to a restorer circuit 20 which is designed to restore the luminance information to the original amplitude range occupied by the input signal wave. This is accomplished by a network having a transmission characteristic which is complementary to that of the pre-emphasis network 10 and is illustrated by curve 40 of Fig. 4.

It is recognized that compression of the lower frequency components of the color television signal results in a sacrifice in the signal-to-noise ratio of the transmission system for the lower frequency components. However, the characteristic triangular noise spectrum of the frequency modulation system greatly favors the lower frequency components and the sacrifice of signal-to-noise ratio can be accepted without material impairment of the overall transmission characteristic. It follows that the color television signal can by the practice of the invention be transmitted over frequency modulation systems having delay distortion characteristics without significant distortions in those portions of the signal containing color information and may be recovered without significant increases in noise.

What is claimed is:

1. The method of transmitting, over a frequency modulation system having delay distortion, color television signals wherein luminance is represented by modulation of a first signal wave and chrominance is represented by variations in a second higher frequency signal wave superimposed upon the modulated first wave which includes compressing the amplitude range of the modulated first signal wave without altering the amplitude range of the second signal wave bearing the chrominance information, transmitting said pre-emphasized color television signal over said frequency modulation system and subjecting the signal appearing at the receiver of said frequency modulation system to complementary de-emphasis to compensate for the action of said pre-emphasis means.

2. The method of transmitting, over a frequency modulation system having inherent delay distortion, color television signals according to the NTSC standard, which includes compressing the amplitude range of components of said color television signal of frequencies up to a frequency of the order of one megacycle per second, transmitting the pre-emphasized color picture signals over said frequency modulation system, and subjecting the color picture signals appearing at the receiver of said system to complementary expansion to restore the compressed portion of the color picture signals to their original amplitude range.

References Cited in the file of this patent

UNITED STATES PATENTS

| | | |
|---|---|---|
| 1,871,986 | Hamilton | Aug. 16, 1932 |
| 2,179,182 | Hansell | Nov. 7, 1939 |
| 2,212,338 | Bown | Aug. 20, 1940 |
| 2,273,719 | Morrison | Feb. 17, 1942 |
| 2,301,907 | Pieracci | Nov. 10, 1942 |
| 2,362,000 | Tunick | Nov. 7, 1944 |
| 2,410,489 | Fitch | Nov. 5, 1946 |
| 2,566,698 | Fredendall | Sept. 4, 1951 |